July 15, 1947.    B. SMALLER    2,423,855
MULTI-UNIT, SINGLE SCALE OXIMETER
Filed Oct. 25, 1943    2 Sheets-Sheet 1
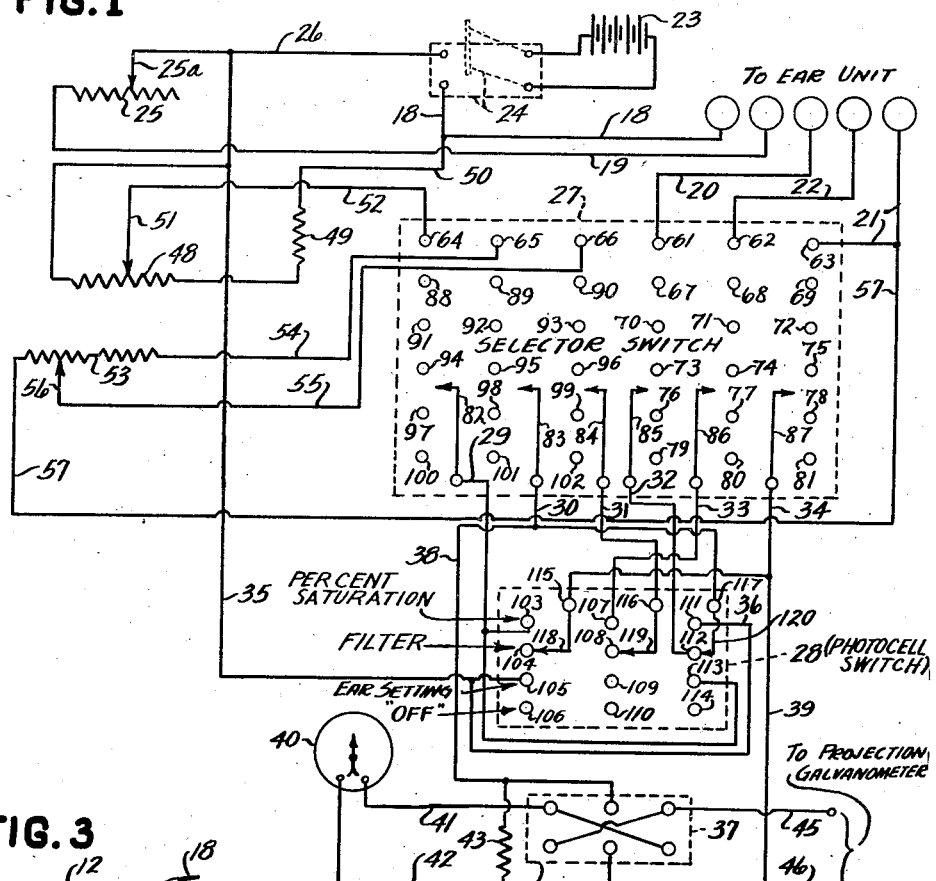
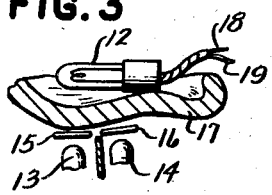
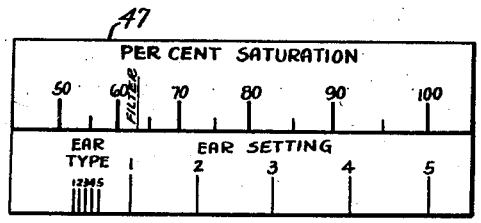
INVENTOR
BERNARD SMALLER
BY Joseph Th. Hazell and Clyde Krantz ATTORNEYS July 15, 1947. B. SMALLER 2,423,855
MULTI-UNIT, SINGLE SCALE OXIMETER
Filed Oct. 25, 1943 2 Sheets-Sheet 2
FIG.4
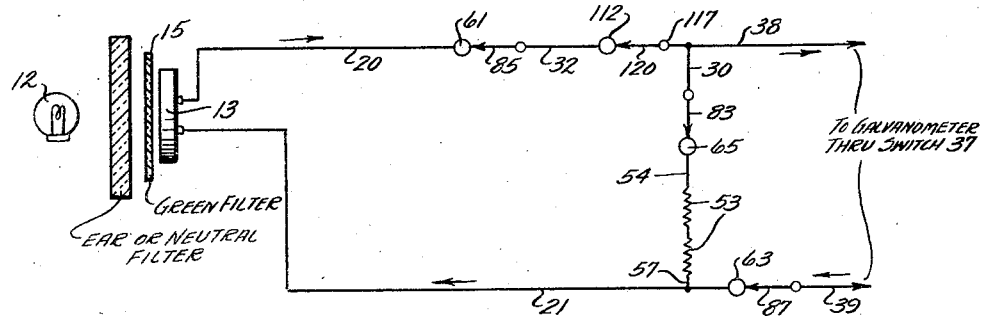
FIG.5
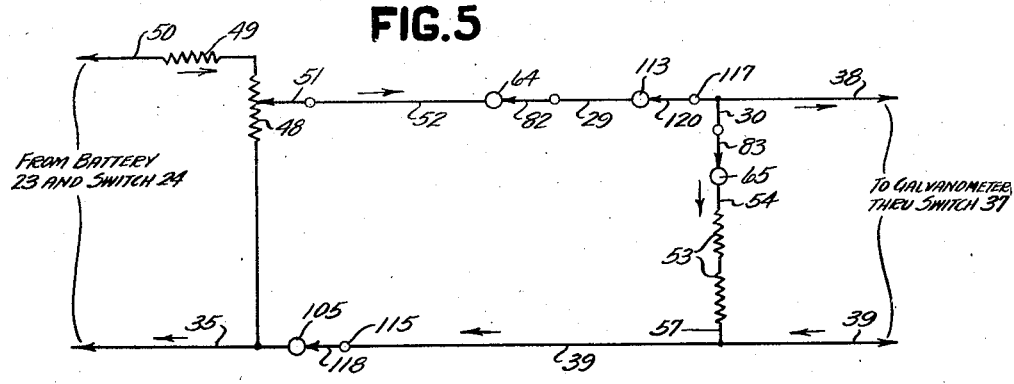
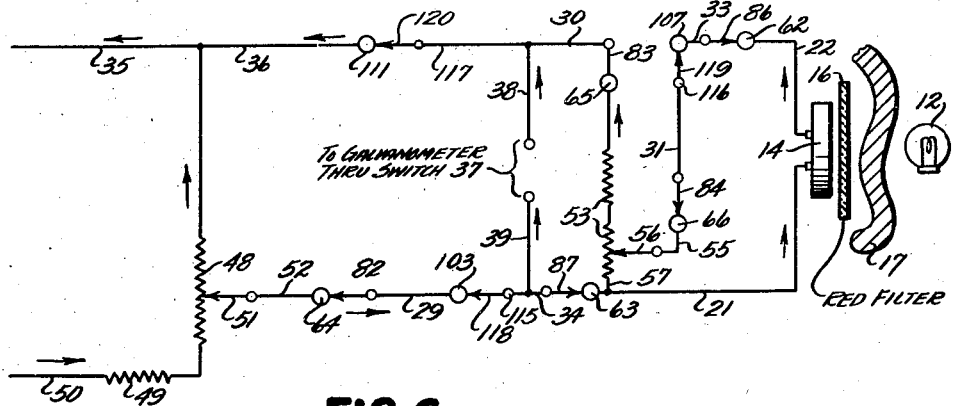
FIG.6
INVENTOR.
BERNARD SMALLER
BY Joseph Ch. Hazell
Clade Koontz
ATTORNEYS Patented July 15, 1947

2,423,855

UNITED STATES PATENT OFFICE 2,423,855

MULTIUNIT, SINGLE SCALE OXIMETER

Bernard Smaller, Chicago, Ill.

Application October 25, 1943, Serial No. 507,634

4 Claims. (Cl. 88—14)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to oximeters and its general object is to provide a multi-unit, single scale oximeter.

The known prior art consists of an oximeter which makes use of the difference in light transmission properties of a green and a red filter to measure the percentage of oxyhemoglobin in the blood. In practice the subject's ear is clamped by an earpiece which includes a source of light on one side of the ear and two photocells on the other side, one photocell being covered by the green filter and producing a current which depends on the total blood thickness of the ear, the other photocell being covered by the red filter and producing a current dependent on the amount of oxyhemoglobin in the blood. The band of light frequencies passing through the green filter is absorbed almost equally well by both oxyhemoglobin and reduced hemoglobin, while that passing through the red filter is more strongly absorbed by reduced hemoglobin; hence by measuring the amount of light falling upon the photocells, one may measure both the blood thickness and the oxygenated blood. An instrument (essentially a galvanometer) can be calibrated in terms of per cent saturation of oxyhemoglobin and by means of enlarged illuminated scales very sensitive readings of the condition of the subject's blood may be taken at any point desired.

To those skilled in anesthesia and oxygen therapy, the value of the described apparatus will be obvious. In altitude chambers, used by the Army Air Forces, and in decompression chambers, employed by the Navy in connection with deep sea diving, the described oximeter will be useful since it permits readings to be taken continually from outside the chamber of the condition of the subject's blood, thereby making it possible to guard against acute anoxemia or even collapse.

The specific objects of this invention are to provide an oximeter having the following advantages:

First, the "ear type" and "per cent saturation" readings are taken with the same light intensity, which is so low that no discomfort is caused.

Second, the ear is kept in thermal equilibrium so that there is practically no drift.

Third, the multi-scale is replaced by a single scale. By utilizing this single scale a number of ear units can be wired into the same circuit.

Fourth, a single photocell switch is employed to control all the ear units.

Fifth, the compensation for the ear type also compensates for vasodilation, and the instrument will always give a true reading no matter how much vasodilation occurs.

In the accompanying drawings forming a part of this specification,

Fig. 1 is a simplified wiring diagram, being one-sixth of a complete diagram for the actual oximeter, minus the earpiece circuits;

Fig. 2 is an elevation of the single scale of the oximeter;

Fig. 3 is a diagram of an earpiece shown with part of an ear in section;

Fig. 4 is a schematic wiring diagram of the "filter" or "ear type" circuit;

Fig. 5 is a schematic wiring diagram of the "suppression" circuit; and

Fig. 6 is a schematic wiring diagram of the "per cent saturation" circuit.

Referring particularly to the drawings, an earpiece of the prior art having ear clamping means (not shown) is provided with a 6 v. lamp bulb 12, photocells 13, 14 which are shielded from each other, green filter 15 and red filter 16, and is adapted to be secured to the scapha membrane of the ear 17 of a subject or patient. Instead of the ear, other parts of the body could be clamped. Conductors 18, 19 connect lamp bulb 12 with a 6 v. circuit, conductors 20, 21 connect the green filtered photocell 13 with a selector switch (to be described) and conductors 22, 21 connect the red filtered photocell 14 with the same selector switch. The bulb 12 is energized from a source of 6 v. current such as a battery 23 when the main switch 24 is closed. Conductor 19 connects with a variable or "filter" rheostat 25 having a lead 26 connecting it with a switch 24, while conductor 18 is directly connected to switch 24 as shown. The movable contact 25a of the "filter" rheostat provides means for controlling the intensity of the light emanating from bulb 12.

To control the various earpiece circuits, a 6 pole, 6 position gang selector switch 27 is employed, with connections for plugging in six ear unit extensions, whereby six subjects may undergo a test together. A photocell switch 28 is coupled by leads 29, 30, 31, 32, 33 and 34 to the selector switch and further has a lead 35 and shunt 36 connecting it to lead 26, whereby the source of current is coupled with the photocell switch. Moreover there is a galvanometer switch 37 coupled by leads 38, 39 with the selector switch, and also with the photocell switch. The galvanometer switch may couple a table galvanometer 40 in the circuit by leads 41, 42 (with a resistance 43 shunted across leads 38 and 42) or may couple a projection galvanometer (not shown) by means of leads 45, 46. The projection galvanometer is provided with a preferably illuminated scale 47, but the scale light and its circuit are omitted because they do not contribute to an understanding of the invention.

A rheostat 48 for controlling the "ear setting" is shown coupled through resistance 49 with a lead 50 connected to light switch 24. The other side of rheostat 48 is connected to lead 35 so as to be in parallel with the "filter" rheostat 25. The movable contact 51 of rheostat 48 is connected to the selector switch by means of lead 52. Rheostat 48 makes it possible to put a variable potential across either galvanometer, to give a galvanometer current of one direction when the photocell switch is set to the "ear setting' position and of the opposite direction when the photocell switch is in the "per cent saturation' position. In this way the operator can, in effect, set back the zero of the galvanometer (when no current is flowing from the red filtered photocell).

To provide a sensitivity control in the photocell circuit, an Ayrton shunt 53 is connected by leads 54 and 55 to the selector switch, lead 55 being connected with the movable contact 56 of the Ayrton shunt. An Ayrton shunt is a circuit utilized where one desires a fixed critical damping resistance in parallel with the galvanometer and yet a variable sensitivity of the galvanometer. The third lead 57 is connected through conductor 21 with the selector switch. Now when the photocell switch is set to the "filter" position, the full sensitivity of the galvanometer is connected to the green filtered photocell (leads 20 and 21) and when it is set to "per cent saturation" position, the red filtered photocell is connected through leads 21 and 22 to the variable shunt of the galvanometer. Thus the zero can be set back by means of the variable potential to any value as shown by the "filter" reading and the sensitivity control of the Ayrton shunt can be advanced to any value desired. The ear settings for the various ear thicknesses are such that the prior art's multi-scale for different ear thicknesses may be replaced by the single scale 47 upon using the proper ear setting. The sensitivity control (i. e. Ayrton shunt) can then be advanced until the movable light beam of the projection galvanometer shows 100% saturation on the scale 47 if the subject is breathing oxygen or 95% if breathing atmospheric air.

In the diagram of Fig. 1 only five leads are shown for one ear unit, whereas in the preferred apparatus six sets of these leads are used for the six ear units employed. Furthermore, there will be six sets of rheostats 25, 48 and 53, but only one selector switch, one photocell switch, one galvanometer switch and one scale, when six subjects are to be tested. The current may be supplied by the single battery 23 and controlled by the single switch 24 for all six sets by connecting the sets to the leads 18, 26. However, it will be clear that more than six subjects may be tested if appropriate changes in the described apparatus are made.

The selector switch 27 has fixed contacts 61, 62, and 63, to which the terminals of leads 20, 22, and 21 respectively, are connected; and contacts 64, 65, and 66 to which the terminals of leads 52, 54, and 55, respectively, are connected. Five other groups of six fixed contacts 67, 68, 69 and 88, 89, 90; 70, 71, 72 and 91, 92, 93; 73, 74, 75 and 94, 95, 96; 76, 77, 78 and 97, 98, 99; and 79, 80, 81 and 100, 101, 102 are respectively adapted to be connected to five other ear units each unit including a rheostat as 48 and an Ayrton shunt as 53 in the manner shown for connecting the ear unit to the contacts 61–66, inclusive, to provide a six position selector switch. The selector switch is turnable manually to any one of the six positions, each position closing a circuit through one of the six groups of contacts identified above. The movable parts of the selector switch 27 are diagrammatically indicated by the arrows 82, 83, 84, 85, 86, and 87 which represent movable contacts operative as a gang and are in two groups, contacts 85, 86, and 87 being adapted to cooperate with the fixed contacts to close a circuit in any one of the six positions to electrically connect leads 20, 22, and 21 of the corresponding ear unit with the leads 32, 33, and 34. The other group of movable contacts 82, 83, and 84 are adapted to cooperate with the corresponding fixed contacts to close a circuit in any one of the six positions to electrically connect leads 52, 54, and 55 of the corresponding ear unit with the leads 29, 30, and 31. Referring to one ear unit circuit as shown in Fig. 1 it will be seen that when the switch 24 is closed the circuit to the light source 12 is closed as will be apparent and light will shine through the ear membrane 17, reaching the photocells 13, 14 through the filters 15, 16, respectively. The selector switch 27 is now operated to connect the ear unit shown in Figs. 1 and 3 with the photocell switch and the galvanometer circuit, and also to couple the potentiometer 48 and resistor 53 into said galvanometer circuit.

The photocell switch 28 is coupled to the selector switch as already mentioned, and has four positions, viz., an "off" position, with dead contacts 106, 110, 114; an "ear setting" position, with contacts 105, 109, and 113; a "filter" position, with contacts 104, 108, and 112; and a "per cent saturation" position, with contacts 103, 107, and 111. All these contacts of the photocell switch are fixed contacts, against which the movable contacts 118, 119, 120 close. Like contacts 106, 110 and 114, the contacts 104, 108 and 109 are dead. Here again the movable contacts of the switch are shown diagrammatically as arrows, extending from terminals 115, 116, 117 which are coupled respectively to leads 34, 31, and 30. Lead 29 is connected to contacts 103 and 113 while lead 35 is connected to contacts 105, 111.

The galvanometer switch 37 receives current through leads 38 and 39, and permits the operator to connect either the table galvanometer 40, or a projection galvanometer (not shown) to the input circuit. The wiring of switch 37 is such that when one galvanometer is connected, the other is shorted across its terminals to prevent excessive swinging of the suspension with possible damage. Resistor 43, in combination with resistor 53, functions simply as a critical damping resistance to insure the best operating characteristics of the galvanometer.

With this description of the apparatus and the manner in which its parts are connected, the operation will now be described, reference being made to Figs. 4–6, as these diagrams are much easier to follow than Fig. 1.

To operate the oximeter, the galvanometer light is first turned on, and the photocell switch 28 is turned to "off" position. Then the galvanometer is adjusted to read 50 on scale 47, which provides a zero setting or basing point. To effect this adjustment, the scale itself may be moved longitudinally in either direction. Then light switch 24 is closed and the desired number of ear units are plugged into the extensions of the selector switch. Then there is a pause of several minutes to allow the photocells to come to thermal equilibrium. Now the photocell switch is closed to the "filter" position (Fig. 1) wherein the "filter" or "ear type" circuit of Fig. 4 is closed.

The galvanometer is now connected solely to the green filtered photocell 13 as a source of current, and the current flows as indicated by the arrows in Fig. 4. Before using the apparatus to determine the per cent saturation of oxygen in the blood of the subject, the output of the green filtered photocell is first standardized. (This is necessary because photocells as now made have different sensitivities.) This standardization is accomplished by simply inserting a neutral filter instead of the ear 17 between the lamp 12 and the photocells and then adjusting the intensity of the light by means of variable resistor 25, 25a until the photocell output current causes the galvanometer beam to reach the "filter" graduation on the upper scale of Fig. 2. This procedure is repeated for each subject, whenever several subjects are under observation simultaneously, since the photocells of each ear unit will probably differ from those on all the other ear units. The neutral filter is now replaced by the ear, whereupon the galvanometer beam will be deflected to a numerical value corresponding approximately or exactly to one of the graduations under the legend "ear type," on the bottom scale of Fig. 2. This deflection is a measure of the ear thickness or "blood thickness" of the ear under observation.

Having noted the reading on the "ear type" scale, the operator will close the photocell switch 28 to the "ear setting" position (Fig. 1) which puts in operation a suppression circuit as input to the galvanometer. The suppression circuit is energized from the battery 23 and its principal leads are leads 50 and 35. See Fig. 5, showing the direction of current flow. Potentiometer 48 operates as a variable potential divider, allowing a variable amount of current to flow into the galvanometer circuit. Resistor 53 functions as a critical damping resistor. It has been found that the conventional multi-scale previously required for determinations of this kind can be replaced by a single "per cent saturation" scale, independent of ear type, provided the zero of the galvanometer is suppressed an amount dependent on the ear type. (The zero of the galvanometer is defined as the position of the galvanometer beam or needle when no photocell current is flowing through it.) This adjustment or suppression of the galvanometer is accomplished electrically by the suppression circuit of Fig. 5, which moves the galvanometer beam or needle to the left of the scale, Fig. 2, i. e., contra to the normal direction. However, in order to observe the amount of suppression current to be applied, in this position of the photocell switch the direction of the suppression current is reverse and the galvanometer gives a reading to the right on the scale where it can be seen and measured. By means of potentiometer 48 the amount of the suppression current is varied until the galvanometer reads on the "ear setting" scale of Fig. 2 the numerical value that was observed when the "ear type" reading was taken. Where several subjects are observed the above operation should be made for every subject under observation.

The photocell switch is now set to the "per cent saturation" position, and there are then two independent sources of current on the galvanometer circuit. If the red filtered photocell 14 were not generating any current, the suppression circuit would tend to drive the galvanometer beam or needle to the left on the scale. (In Fig. 6 the suppression input leads have been reversed for simplicity.) Thus when no photocell current flows, the galvanometer zero has been suppressed a determinate amount and single scale operation is made possible. Now the red filtered photocell 14 generates a current whose strength is proportional to the relative amounts of oxyhemoglobin and reduced hemoglobin present in the blood of the ear. The percentage of this generated current that will flow through the galvanometer is determined by potentiometer 53 which operates now as an Ayrton shunt. The current flow due to the current generated by photocell 14 is indicated by the arrows in Fig. 6, and the strength of said current flowing through the galvanometer is determined by potentiometer 53, 56. This potentiometer is adjusted by the operator so that the galvanometer reads 95 (i. e., 95% saturation) on the upper or "per cent saturation" scale, Fig. 2, this being a fixed known point of saturation for a normal subject breathing room air at approximately sea level. (If the subject is breathing pure oxygen, the galvanometer should be brought to read 100 on the same scale.) Subsequent readings of the galvanometer should now give the correct value of arterial saturation in per cent, on the upper scale of the galvanometer (Fig. 2). It will be noted that the current supplied by the photocell 14 was required to bring the galvanometer reading from a suppressed zero position to the left of the scale. Thus the true length of the "per cent saturation" scale 47 is dependent on the "ear setting" and hence "ear type." This electrical expansion or contraction of scale 47 to accommodate various ear types allows for single scale operation and is one of the features of the invention.

The final scale reading is not the same in all cases, nor is it the same with one subject, if he is subjected to an altitude chamber test, for example. As his blood stream loses oxygen, the light beam on the galvanometer scale drops from 100% (if breathing oxygen) or 95% (if breathing air) down to 90, then 85, then 80, and so on. The test is nearly always stopped before the subject loses consciousness, and the reading on the galvanometer scale outside of the test chamber will give a clear warning when to expect the subject to become faint prior to losing consciousness.

After thermal equilibrium is reached and the altitude run under way, the "per cent saturation" of each of six subjects may be obtained separately by rotating the selector switch. If vasodilation of the ear is suspected during the course of a run (i. e., the "per cent saturation" reading is too low for the corresponding altitude), check the ear setting reading by adjusting the photocell switch to the "ear setting" position and if a change has occurred, correct by adjusting the ear setting rheostat.

Without further description, it will be clear that the apparatus has the advantages enumerated above. Obviously the apparatus may be changed in many particulars without departing from the invention as claimed.

What I claim is:

1. An oximeter comprising a galvanometer, an ear unit including a source of light, a green filtered photocell and a red filtered photocell, said photocells being positioned to receive light from said source passing through an interposed ear, and means for selectively connecting said photocells to the galvanometer, said galvanometer having a scale member provided with graduations for indicating the oxygen concentration of the blood in a subject's ear, and other graduations for indicating ear type potentials corresponding to different ear thicknesses, the positions of the last mentioned graduations on said scale member being so related to the different ear thicknesses and the positions of the first mentioned graduations that a voltage sufficient to deflect the galvanometer to any one of said last mentioned graduations will, when applied to the galvanometer with reversed polarity, reduce the deflection produced by the red filtered photocell by an amount proportional to the ear thickness corresponding to said one graduation, means for applying to the galvanometer a voltage independent of the voltage applied by said photocells, manually adjustable means for varying said voltage so as to deflect the galvanometer to the ear type potential indicating graduation corresponding to the thickness of the subject's ear as determined by means of the green filtered photocell, said means for selectively connecting the photocells to the galvanometer including means for reversing the polarity of said voltage simultaneously with the connection of the red filtered photocell to the galvanometer, and manually adjustable means for varying the voltage applied to the galvanometer by said red filtered photocell to deflect the galvanometer to a point on the concentration scale representative of the normal oxygen concentration for the atmosphere available, whereby subsequent changes in oxygen concentration of the blood will be indicated directly on the concentration scale.

2. An oximeter comprising a galvanometer, an ear unit including a source of light, a green filtered photocell and a red filtered photocell, said photocells being positioned to receive light from said source passing through an interposed ear, and a circuit including a switch means for selectively connecting said photocells to the galvanometer, said galvanometer having a scale member provided with graduations for indicating the oxygen concentration of the blood in a subject's ear, and other graduations for indicating ear type potentials corresponding to different ear thicknesses, the positions of the last mentioned graduations on said scale member being so related to the different ear thicknesses and the positions of the first mentioned graduations that a voltage sufficient to deflect the galvanometer to any one of said last mentioned graduations will, when applied to the galvanometer with reversed polarity, reduce the deflection produced by the red filtered photocell by an amount proportional to the ear thickness corresponding to said one graduation, a suppression circuit for applying to the galvanometer a voltage independent of the voltage applied by said photocells, a potentiometer in said suppression circuit for varying said suppression circuit voltage so as to deflect the galvanometer to the ear type potential indicating graduation corresponding to the thickness of the subject's ear as determined by means of the green filtered photocell, said switch means of the circuit for selectively connecting the photocells to the galvanometer including a switch means for reversing the polarity of said suppression circuit voltage simultaneously with the connection of the red filtered photocell to the galvanometer, and a potentiometer for varying the voltage applied to the galvanometer by said red filtered photocell to deflect the galvanometer to a point on the concentration scale representative of the normal oxygen concentration for the atmosphere available, whereby subsequent changes in oxygen concentration of the blood will be indicated directly on the concentration scale.

3. An oximeter comprising a galvanometer, an ear unit including a source of light and a red filtered photocell, said photocell being positioned to receive light from said source passing through an interposed ear, and a circuit including a switch means for connecting said photocell to said galvanometer, said galvanometer having a scale member provided with graduations for indicating the oxygen concentration of the blood in a subject's ear, and other graduations for indicating ear type potentials corresponding to different ear thicknesses, the positions of said other graduations on said scale member being so related to the different ear thicknesses and the positions of the first mentioned graduations that a potential sufficient to deflect the galvanometer to any one of said other graduations will, when applied to the galvanometer with reversed polarity, reduce the deflection produced by the red filtered photocell by an amount proportional to the ear thickness corresponding to said one graduation, a voltage supply and circuit for applying a potential to said galvanometer independent of the voltage applied by the photocell, potentiometer means in said voltage supply circuit for varying said potential so as to deflect the galvanometer to the ear type potential indicating graduation corresponding to the thickness of the subject's ear, said switch means in said circuit for connecting the photocell to the galvanometer including a switch means for reversing the polarity of said voltage supply potential simultaneously with connection of the photocell to the galvanometer, and potentiometer means in the circuit connecting the photocell with the galvanometer for varying the voltage applied to the galvanometer by said photocell to deflect the galvanometer to a point on the concentration scale representative of the normal oxygen concentration for the atmosphere available, whereby subsequent changes in oxygen concentration of the blood will be indicated directly on the concentration scale.

4. An oximeter comprising a galvanometer, an ear unit including a source of light, a green filtered photocell and a red filtered photocell, said photocells being positioned to receive light from said source passing through an interposed ear, and means for selectively connecting said photocells to the galvanometer, said galvanometer having a scale member provided with a first set of graduations for indicating the oxygen concentration of the blood in a subject's ear, a second set of graduations adjacent the first mentioned graduations for indicating ear type potentials corresponding to different ear thicknesses, and a third set of graduations for indicating relative ear thicknesses as determined by the green filtered photocell, the positions of the second set of graduations on said scale member being so related to the different ear thicknesses and the positions of the first mentioned graduations that a voltage sufficient to deflect the galvanometer to that one of said second set of graduations which corresponds to the graduation of said third set to which the galvanometer is deflected when the subject's ear is interposed in the ear unit with the green filtered photocell selectively connected to the galvanometer will, when applied to the galvanometer with reversed polarity, reduce the deflection produced by the red filtered photocell by an amount proportional to the ear thickness corresponding to said one graduation of said second set, means for applying to the galvanometer a voltage independent of the voltage applied by said photocells, manually adjustable means for varying said independent voltage so as to deflect the galvanometer to the ear type potential indicating graduation corresponding to the thickness of the subject's ear, said means for selectively connecting the photocells to the galvanometer including means for reversing the polarity of said independent voltage simultaneously with the connection of the red filtered photocell to the galvanometer, and manually adjustable means for varying the voltage applied to the galvanometer by said red filtered photocell to deflect the galvanometer to a point on the concentration scale representative of the normal oxygen concentration for the atmosphere available, whereby subsequent changes in oxygen concentration of the blood will be indicated directly on the concentration scale.

BERNARD SMALLER.

REFERENCES CITED

The following references are of record in the file of this patent:

UNITED STATES PATENTS

| Number | Name | Date |
|---|---|---|
| 2,358,992 | Millikan | Sept. 26, 1944 |